G. FITCH & P. SHAFFER.
Machine for Forging Metallic Sockets.
No. 6,404. Reissued April 27, 1875.
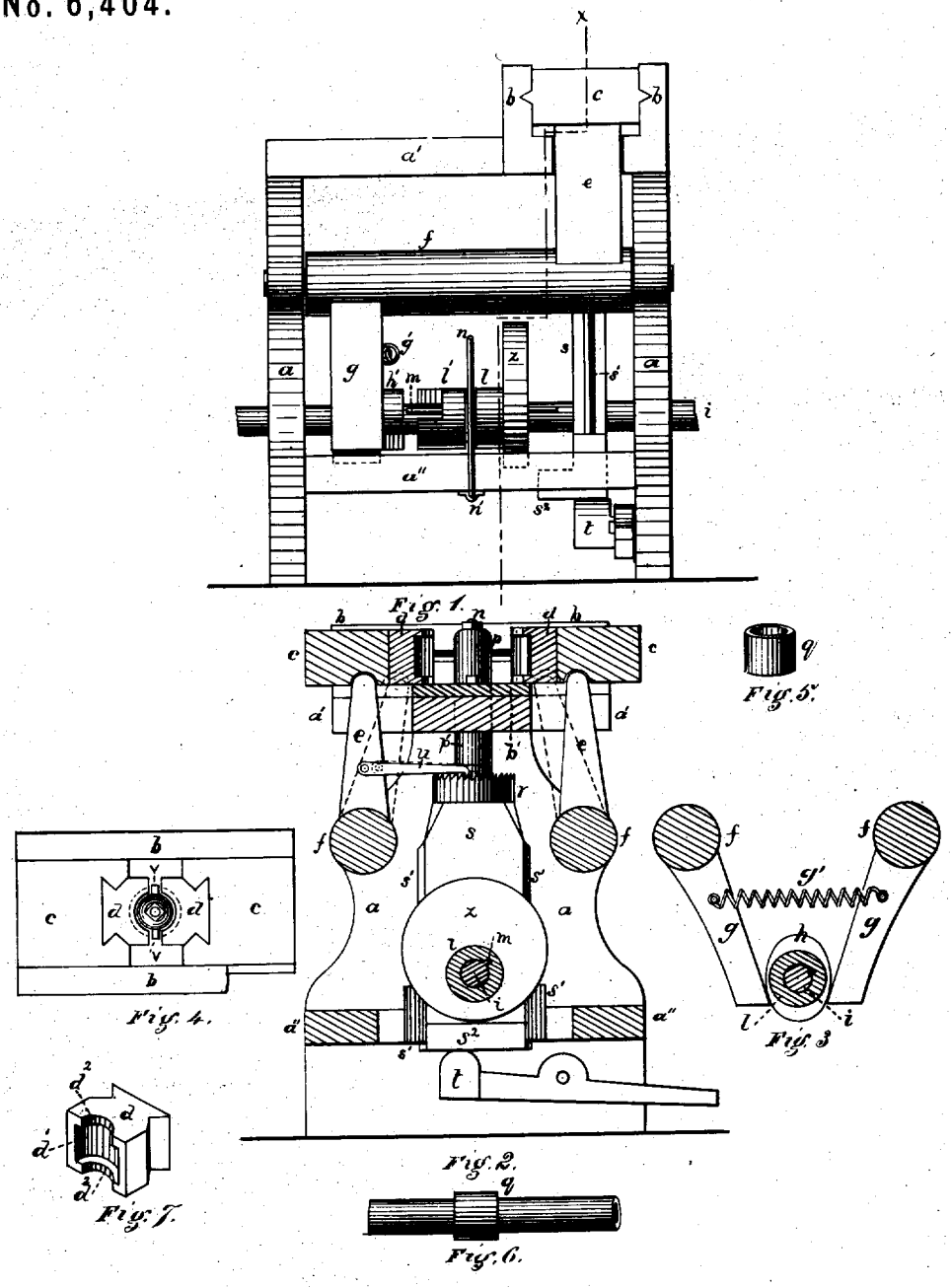
Witnesses { Charles G. Page
Claudius B. Parker.
Inventors: George Fitch,
Peter Shaffer,
by Geo. H. Christy
their atty.

UNITED STATES PATENT OFFICE.

GEORGE FITCH AND PETER SHAFER, OF ETNA, ASSIGNORS, BY MESNE ASSIGNMENTS, TO GEORGE FITCH AND JOHN D. HIEBER, OF SAME PLACE, AND FREDERICK G. SEGEBRUCK, OF MILLVALE, PA.

IMPROVEMENT IN MACHINES FOR FORGING METALLIC SOCKETS.

Specification forming part of Letters Patent No. 134,045, dated December 17, 1872; reissue No. 6,404, dated April 27, 1875; application filed January 29, 1875.

*To all whom it may concern:*

Be it known that we, GEORGE FITCH and PETER SHAFER, both of Etna borough, Allegheny county, Pennsylvania, have invented a new and useful Improvement in Manufacture of Metallic Sockets; and we do hereby declare the following to be a full, clear, and exact description of the same, reference being had to the accompanying drawing, making a part of this specification, in which—like letters indicating like parts in the several figures—

Figure 1 is a side elevation of the improved machine for welding and shaping metallic sockets. Fig. 2 is a vertical sectional elevation along the plane of the line *x x*, Fig. 1. Fig. 3 is a detached sectional view illustrative of the means for imparting a reciprocating motion to the dies. Fig. 4 is a plan view of the dies and mandrel detached. Fig. 5 shows a welded and finished socket. Fig. 6 illustrates its use as a tube-connection, and Fig. 7 is a perspective view of one of the dies.

This invention consists in an improved machine for the manufacture of metallic sockets usually employed for joining together the adjacent ends of gas, water, and other pipes and tubes by welding and finishing the same after being bent on a rotating mandrel at a single heat, and at one operation, and in the construction of a machine for such purposes, substantially as hereinafter described and claimed.

In a frame consisting of end pieces *a a* and top and bottom plates *a′ a″* are arranged the operative parts of the machine. At or near one end of the top plate *a′* is a pair of guides, *b b*, which carry by tongues and grooves a pair of sliding die-heads or die-holders, *c c*, with dies *d d* set in their inner adjacent ends, the inner or working faces of such dies being such as are adapted to weld, form, and finish the socket-blank and socket on which they operate. The die-holders *c c* are caused to move to and from the socket-blank or socket by means of a pair of vibrating or oscillatory arms, *e e*, which extend from the shafts *f f* into suitable sockets or recesses of the die-holders. A like pair of vibratory or oscillatory arms, *g g*, also extend from the shafts *f*, in such manner as to come in contact with and be actuated by a double eccentric or cam, *h*, which is attached on a shaft, *i*. The shafts *f f* and *i* have their bearings in the end parts *a a* of the frame, and the shaft *i* is preferably extended at one or both ends outside the frame, for greater convenience in applying the driving power thereto. The shaft *i* also carries a sliding hub, *l*, fitted thereon by a groove and a feather, *m*, or other like means. The end of this hub next the double cam *h* is made in the form of a clutch, as at *l′*, and the counterpart of such clutch is made on the adjacent end of the cam *h*, as at *h′*. On the opposite end of the hub *l* is an eccentric or cam, *z*, the construction, however, being such that the clutch and eccentric will not both be practically in operation at the same time. The hub *l* is shifted in position either way by the common form of shifting-lever *n* engaging the hub by a groove, and having its fulcrum at *n′*. The arms *g g* are held as against the action of the cam *h*, and caused to make their return stroke by a spring, *g′*. A cylindrical mandrel, *p*, extends through the top plate *a′*, and through a plate, *b′*, which forms a rest and support for the mandrel, and so as to come in proper position relative to the dies for the proper action of such dies on the socket-blank when the latter is placed on the mandrel. This mandrel is affixed to a spindle, *p′*, by a nut, *n*, and this spindle is connected with a circular ratchet, *r*, and both resting upon a vertically-moving post, *s*, but in such manner that while they will move up and down with the post *s* they may also receive a rotary motion independent of the post. The post *s* is properly guided in its vertical motion by guides *s′* in the lower plate *a″*. An upward motion is imparted to it by a treadle, *t*, and a downward motion by the eccentric *z* engaging a shoulder or flange, $s^2$, thereon, and a pawl, *u*, attached to one of the oscillatory arms *e*, furnishes means for giving to the mandrel *p* the desired rotary motion.

The dies *d* are made concave on their working-faces, as shown particularly in Fig. 7, so as to be adapted to the work to be done, and are also recessed, as at $d^1$, so as to have on each a flange, $d^2$, at the top and bottom of its working-face. The vertical height of the recess $d^1$ is equal, or about equal, to the length of the socket, $q$, to be made, and the depth of each such recess is equal, or about equal, to the thickness of the material which forms the finished socket. The mandrel $p$ has one or more projections, $v$, of about the same height as the lower flange $d^2$, and on which, while being welded and finished, the socket rests. The dies $d$ are removable, as also the mandrel $p$, so as to substitute other dies and a correspondingly-shaped mandrel for the manufacture of sockets of other sizes. The plate $b'$ is removable for like purposes.

In practical operation, the socket-blank, previously bent to cylindrical form, is slipped over the mandrel $p$. The dies are then caused to operate on it by a rapid succession of blows, imparted to it successively on all sides, so as to weld, compress, and finish it ready for tapping at one heat and one operation. The diameter and the cylindrical form of its eye is imparted by the mandrel on which it is compressed, and the welding and exterior shaping and finishing is done by the action of the dies. The socket is rotated after each stroke of the dies by the rotation of the mandrel after each stroke of the dies, which latter is secured by the pawl $u$ and ratchet $r$. In this way the sockets are made perfectly true and uniform for all practical purposes, so that as soon as tapped they are ready for use. They are discharged from the mandrel by means of the cam $z$ acting on the shoulder $s^2$, and so drawing down the post $s$, spindle $p'$, and mandrel $p$.

Other well-known devices may be used for rotating the mandrel $p$ and for operating the dies.

The use to which the sockets are put after being made is not material so far as relates to the present invention, as, after being made of accurate bore, to the desired length, and with a good exterior finish, in the manner set forth, they may be put to a variety of uses.

What is claimed herein as the invention of the said GEORGE FITCH and PETER SHAFER is—

1. The method of welding metallic socket-blanks and converting said blanks into sockets, finished internally and externally, on a rotating mandrel and by suitable dies, at one operation and one heat, substantially as set forth.

2. The combination of an intermittently-rotating mandrel, for supporting internally the walls of the socket, and reciprocating dies, bounded above and below by transverse walls, to prevent longitudinal extension of the socket, substantially as set forth.

3. The combination of reciprocating dies $d$ $d$, vibratory arms $e$ $e$, and ratchet and pawl $r$ $u$, whereby the mandrel is rotated when the dies are retracted, and is stationary at the forward stroke of the dies, substantially as set forth.

4. The sliding hub $l$, carrying an eccentric or cam at one end and a clutch at the other, and suitably arranged to operate the dies in one position and discharge the finished socket in the other, substantially as set forth.

5. The combination of mandrel $p$, one or more projections, $v$, and recessed and flanged dies $d$, substantially as set forth.

GEORGE FITCH.
PETER SHAFER.

Witnesses:
I. L. ELSESSER,
CHARLES G. PAGE.